United States Patent [19]

Yamada

[11] Patent Number: 5,396,439

[45] Date of Patent: Mar. 7, 1995

[54] ACCELERATION SENSING DEVICE HAVING NEGATIVE FEEDBACK LOOP

[75] Inventor: Keizo Yamada, Tokyo, Japan

[73] Assignee: NEC Corporation, Tokyo, Japan

[21] Appl. No.: 928,293

[22] Filed: Aug. 12, 1992

[30] Foreign Application Priority Data

Aug. 20, 1991 [JP] Japan .................................. 3-207694

[51] Int. Cl.$^6$ .............................................. G06F 15/20
[52] U.S. Cl. ............................... 364/566; 73/517 R; 73/517 B; 364/424.05
[58] Field of Search .................... 73/517 R, 517 B; 364/424.05, 566

[56] References Cited

U.S. PATENT DOCUMENTS

| | | | |
|---|---|---|---|
| 3,151,487 | 10/1964 | Schuck | 73/517 R |
| 3,646,818 | 3/1972 | Little et al. | 73/517 R |
| 3,707,091 | 12/1972 | Morris et al. | 73/517 B |
| 3,843,077 | 10/1974 | Boone et al. | 364/429 X |
| 4,887,467 | 12/1989 | Sakuma et al. | 73/517 B |
| 4,945,336 | 7/1990 | Itoh et al. | 340/438 |
| 5,166,880 | 11/1992 | Furui | 364/424.05 |

FOREIGN PATENT DOCUMENTS 63-255664  10/1988  Japan .

*Primary Examiner*—Edward R. Cosimano
*Attorney, Agent, or Firm*—Young & Thompson

[57] ABSTRACT

An output signal of an acceleration sensor is supplied to a DC amplifier to thereby generate an acceleration output. A low frequency component of the acceleration output of the DC amplifier is negatively fed back by a feedback circuit to the input of the DC amplifier.

29 Claims, 16 Drawing Sheets

ACCELERATION SENSING DEVICE HAVING NEGATIVE FEEDBACK LOOP

BACKGROUND OF THE INVENTION

1. Field of the Invention

The present invention relates to a sensing device for an acceleration sensor which is used for detecting a dynamic transition state, i.e., an acceleration state or a deceleration state of an object.

2. Description of the Related Art

Generally, an acceleration sensor detects a dynamic transition state such as an acceleration state or a deceleration state of an object. Therefore, the acceleration sensor can be used for measuring a vibration of the object. For example, in an automobile, the acceleration sensor can be used in the determination of a collision to activate an airbag. Also, the velocity of an object can be measured by integrating the output of the acceleration sensor, and in addition, the displacement of the object can be measured by integrating such a velocity. Therefore, the acceleration sensor can be also used in a transition control system which is for example, used for increasing or decreasing a fuel injection amount in an automobile.

As an acceleration sensor, a semiconductor acceleration sensor using the piezoresistance effect, which is small in size, light in weight, has a large anti-impact characteristic, and the like, is well known (see: Japanese Unexamined Patent Publication (Kokai) No.Sho 63-255664). The semiconductor acceleration sensor uses the strong mechanical strength of silicon and fine lithography technology applied thereto. The semiconductor acceleration sensor mainly includes a weight for receiving an acceleration force (inertia force), a cantilever having a stationary end and a free end for converting the acceleration force into a stress, and an element for converting this stress into an electrical signal. For example, the element for converting the stress into the electrical signal is constructed with a piezoresistance element by forming a diffusion region within a monocrystalline silicon substrate. In this case, in order to maximize a stress sensitivity change of the piezoresistance element, a bridge circuit is constructed having the piezoresistance element in at least one edge of the bridge circuit. Usually, since the voltage amplitude of the output signals of a bridge circuit is too small to be supplied to a circuit such as an interface of a microcomputer, the voltage amplitude is amplified by an amplifier, and accordingly, this voltage amplitude is on the order of some volts. In this case, the voltage amplification factor of such an amplifier is very large, for example, from 10 to 100,000. When the voltage amplification factor of the amplifier is large, an offset voltage due to the unbalance of the bridge circuit (i.e., the fluctuation of the piezoresistance element) and a thermal drift (i.e., a fluctuation of the offset voltage) strongly affects the output of the amplifier, and accordingly, it is impossible to ensure the accuracy of a measured acceleration within a wide range of temperature. At worst, a large offset voltage generated in the bridge circuit saturates the operation of the amplifier to disable the amplifier.

To ensure operation over a wide temperature range, a prior art acceleration sensing device for the above-mentioned semiconductor acceleration sensor includes a differential amplifier which has a small amplification factor, a high pass filter for removing a DC component from an output of the differential amplifier, and a main amplifier having a large amplification factor (see: FIG. 3 of Kokai No.Sho 63-255664). That is, this acceleration sensing device has a two-stage amplification configuration to ensure a wide temperature range operation, which will be explained later in detail.

In the above-mentioned prior art acceleration sensing device, however, since the high pass filter includes a capacitor, the phase and amplitude of a sensing signal are dependent upon the frequency thereof, and accordingly, it is impossible to ensure accurate acceleration sensing. At worst, when the phase of a sensing signal is too changed, a positive acceleration may be recognized as a negative acceleration (i.e., deceleration), or vice versa. Also, when the amplitude of the sensing signal is changed, it is impossible to measure an absolute value of acceleration.

In addition, in the above-mentioned prior art device, the capacitor of the high pass filter is connected in series to the main amplifer which may be constructed by an operational amplifier having a feedback resistor. Therefore, a bias current, which may enable the main amplifier to be operated stably, is not supplied to the main amplifier, and as a result, the main amplifier cannot operate normally, which also does not ensure an accurate acceleration sensing.

Further, in the above-mentioned prior art device, the capacity of the capacitor of the high pass filter has to be large to reduce the output impedance thereof. Otherwise, a noise characteristic of the high pass filter is inhibited.

Still further, in the above-mentioned prior art, although there is no offset effect in the output signal of the high pass filter due to the differential amplifier and the capacitor of the high pass filter, an offset voltage may be generated in the output signal of the main amplifier due to the fact that the main amplifier has an inherent offset voltage. Therefore, the main amplifier requires a good offset characteristic, which increases the manufacturing cost of the acceleration sensing device.

Further, since the capacitor is interposed serially in the prior art device, this device generates very little acceleration output showing an absolute value of the acceleration force. That is, this device is suitably used only for measuring an absolute value of acceleration or deceleration, a vibration of an object which has a relatively high frequency. In other words, this device is not suitable for measuring a velocity, a displacement, and the like, of an object, i.e., this device is not suitable for a transition control system which is, for example, used for increasing or decreasing a fuel injection amount when acceleration or deceleration occurs.

SUMMARY OF THE INVENTION

It is, therefore, an object of the present invention to ensure an accurate acceleration sensing in an acceleration sensing device for an acceleration sensor.

Another object of the present invention is to provide an acceleration sensing device which has an anti-noise characteristic.

It is a further object of the present invention to reduce the manufacturing cost of an acceleration sensing device.

It is a still further object of the present invention to provide an acceleration sensing device which can also measure an absolute value of acceleration which has a relatively low frequency.

According to the present invention, an output signal of an acceleration sensor is supplied to a DC amplifier thereby to generate an acceleration output. Also, a low frequency component of the acceleration output of the DC amplifier is negatively fed back by a feedback circuit to the input of the DC amplifier. Thus, even if the feedback circuit includes a capacitor, such a capacitor does not exist in series between the output of the acceleration sensor and the acceleration output, and as a result, the phase and amplitude of the acceleration sensor is not dependent upon the frequency of the output of the acceleration sensor. Also, since there is no capacitor means in the input of the DC amplifier, it is possible to ensure a bias current being supplied to the DC amplifier, thereby allowing the DC amplifier to operate normally. This also contributes to an accurate acceleration sensing value. Further, since the DC amplifier usually has a high input impedance, the capacity of the capacitor of the feedback circuit can be reduced to thereby improve the noise characteristic thereof. Further, since the DC amplifier per se can cancel an offset voltage generated in the DC amplifier, the manufacturing cost is inexpensive.

Also, according to the present invention, a switch means or a resistance changeable means is connected to the feedback circuit to disable the feedback circuit. Thus, after the feedback circuit is enabled for a predetermined time period to adjust the offset characteristic of the acceleration sensor, the feedback circuit can be disabled by the above-mentioned switch or resistance changeable means so that the DC amplifier may generate an absolute value of acceleration without an offset voltage and a thermal drift thereof.

BRIEF DESCRIPTION OF THE DRAWINGS

The present invention will be more clearly understood from the description as set forth below, as compared with the prior art, with reference to the accompanied drawings, wherein.

DESCRIPTION OF THE PREFERRED EMBODIMENTS

Figure 3:
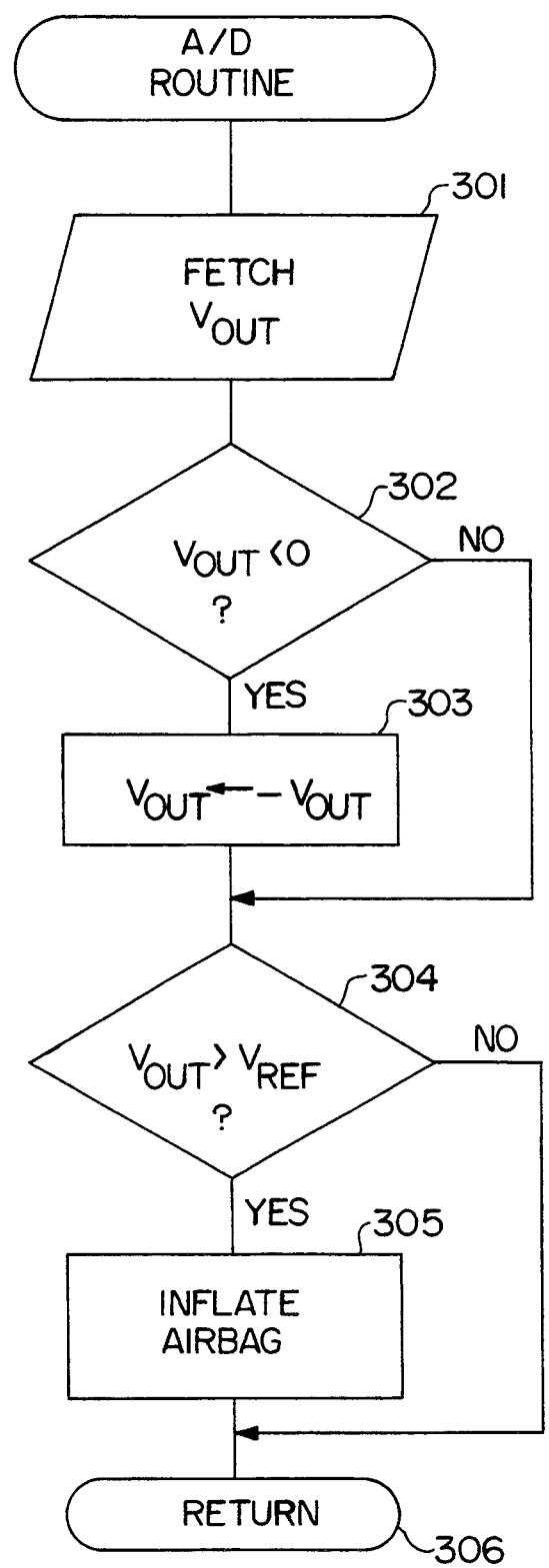
FIG. 3 is a flowchart showing the operation of the control circuit of FIG. 2.

Before the description of the embodiments, a prior art acceleration sensing device will be explained with reference to FIG. 1 (see: FIG. 3 of Kokai No.Sho 63-255664).

Figure 1:
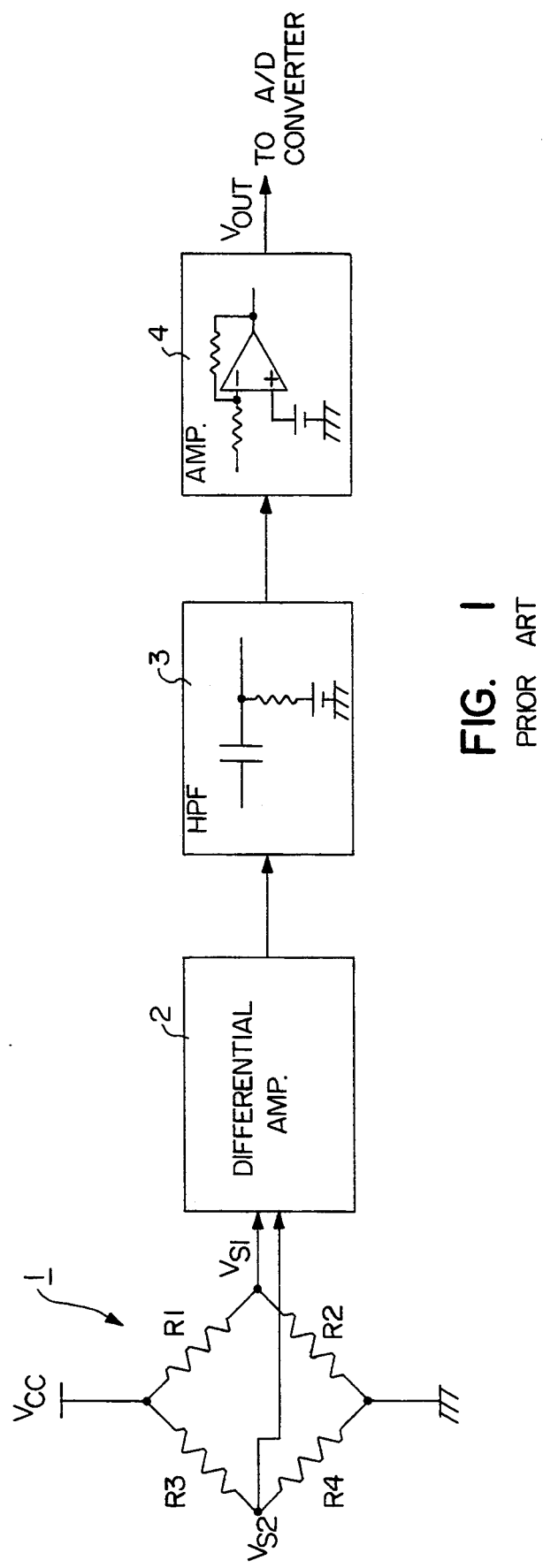
FIG. 1 is a block circuit diagram illustrating a prior art acceleration sensing device.

In FIG. 1, a bridge circuit 1 is constructed by four piezoresistance elements R1, R2, R3, and R4 which are formed within the monocrystalline silicon substrate (not shown) including a weight, a cantilever, and the like, as explained above. When an acceleration (inertia force) is applied to the weight along a predetermined direction, the resistance values of the piezoresistance elements R1, R2, R3, and R4 are changed. For example, when the resistance value of the piezoresistance element R1 is increased, the resistance value of the piezoresistance element R2 is decreased. Simultaneously, the resistance value of the piezoresistance element R3 is decreased, and the resistance value of the piezoresistance element R4 is increased. In this case, the potential $V_{S1}$ at the connection between the elements R1 and R2 is pulled down, while the potential $V_{S2}$ at the connection between the elements R3 and R4 is pulled up. Thus, a small difference is generated between the potentials $V_{s1}$ and $V_{S2}$. This difference in potential is amplified by a differential amplifier 2 which has a small amplification factor. Also, a DC component of the output of the differential amplifier 2 is removed by a high pass filter 3 which is formed by a capacitor and a resistor. After that, the output of the high pass filter 3 is amplified by an amplifier 4, having a high amplification factor, which is, for example, formed by an operational amplifier, a feedback resistor, and the like. Then, an acceleration output $V_{OUT}$ is obtained at the output of the amplifier 4, and is supplied to a post stage such as an analog/digital (A/D) converter. Thus, an offset voltage in the bridge circuit 1 and a thermal drift in the output of the differential amplifier 2 are removed at the output of the high pass filter 3, and an acceleration output value obtained at the output of the amplifier 4 accurately represents an acceleration.

In FIG. 1, however, as explained above, since the high pass filter 3 includes the capacitor, the phase and amplitude of the output signal of the high pass filter 3 are dependent upon the frequency thereof, and accordingly, it is impossible to ensure an accurate acceleration value. At worst, when the phase of the output signal of the high pass filter 3 is too changed, a positive acceleration may be recognized as a negative acceleration (i.e., deceleration), or vice versa. Also, when the amplitude of the output signal of the high pass filter 3 is changed, it is impossible to measure an absolute value of acceleration.

In addition, in FIG. 1, the capacitor of the high pass filter 3 is connected in series to the amplifer 4. Therefore, a bias current, which may enable the amplifier 4 to be operated stably, is not supplied to the operational amplifier of the amplifier 4, and as a result, this operational amplifier cannot operate normally, which also does not ensure an accurate acceleration sensing.

Further, in FIG. 1, the capacity of the capacitor of the high pass filter 3 has to be large to reduce an output impedance thereof. Otherwise, a noise characteristic of the high pass filter 3 is inhibited.

Still further, in FIG. 1, although there is no offset effect in the output signal of the high pass filter 3 due to the differential amplifier 2 and the capacitor of the high pass filter 3, an offset voltage may be generated in the output signal of the amplifier 4 per se. Therefore, the operational amplifier of the amplifier 4 requires a good offset characteristic, which increases the manufacturing cost of the amplifier 4.

Further, since the capacitor is interposed serially in the device of FIG. 1, to cut off a relatively low frequency component of the output signal of the acceleration sensor 1, this device generates very little acceleration output showing an absolute value of the acceleration force which has a relatively low frequency. That is, the device of FIG. 1 is used suitably only for measuring the vibration of an object which has a relatively high frequency. In other words, the device of FIG. 1 is not suitable for measuring a velocity, a displacement, and the like, of an object, i.e., the device of FIG. 1 is not suitable for a transition control system which is, for example, used for increasing or decreasing a fuel injection amount when acceleration or deceleration occurs.

Figure 2:
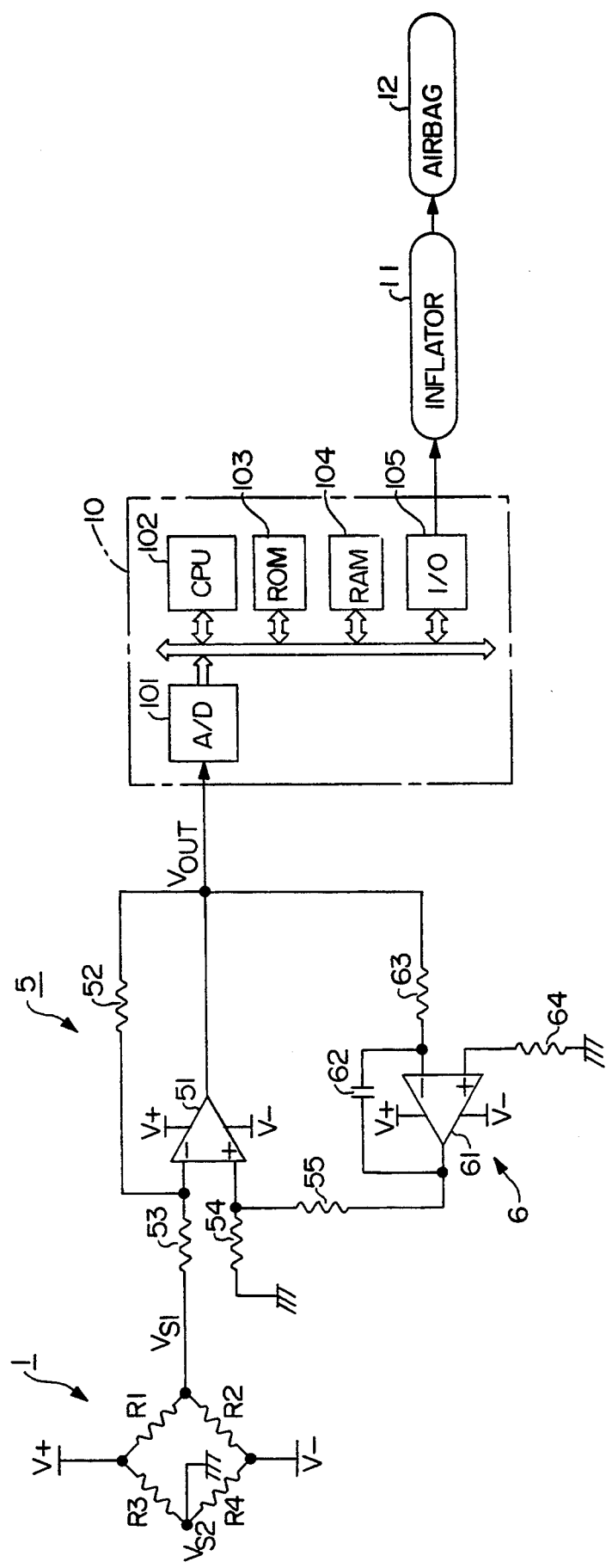
FIG. 2 is a circuit diagram illustrating a first embodiment of the acceleration sensing device according to the present invention.

In FIG. 2, which is a first embodiment of the present invention, reference numeral 5 designates a DC amplifier formed by an operational amplifier 51, a feedback resistor 52, an input resistor 53, and input resistors 54 and 55. The operational amplifier 51 receives a small amplitude potential $V_{S1}$ from the bridge circuit 1 via the input resistor 53 at the inverting terminal thereof. The DC amplifier 5 amplifies the potential of the bridge circuit 1. Note that the DC amplifier has a DC amplification characteristic enabling it to amplify a low frequency signal including a DC signal. Generally, the DC amplifier has a highly linear amplification factor with respect to frequency, which is helpful in obtaining an accurate acceleration value. Also, the values of the resistors 52 and 53 are adjusted to obtain an amplification factor of about 1,000, for example.

Further, a feedback circuit 6 is connected between an output and an input of the DC amplifier 5, to feed back a low frequency component of the output signal of the DC amplifier 5 including a DC component thereof, to the input of the DC amplifier 5. The feedback circuit 6 is a low pass filter formed by an operational amplifier 61, a feedback capacitor 62, and resistors 63 and 64. A current is supplied from the output of the DC amplifier 5 via the resistor 63 to the capacitor 62, to charge it. As a result, a voltage, which has a larger period than a time constant determined by the capacitor 62 and the resistor 63, is induced between the ends of the capacitor 62. Note that the charge stored at the end of the capacitor 62 on the output side thereof has an opposite polarity to the output signal of the DC amplifier 5. Thus, when the output of the feedback circuit 6 is supplied via the input resistors 54 and 55 to the non-inverting input terminal of the operational amplifier 51 of the DC amplifier, 5 the low frequency component (including the DC component) of the DC amplifier 5 is negatively fed back to the DC amplifier 5. Therefore, since the offset voltage and the thermal drift thereof in the bridge circuit 1 is supplied via the input resistor 53 to the inverting input terminal of the operational amplifier 51, the low frequency component of the DC amplifier 5 is cancelled within the operational amplifier 51. As a result, the offset voltage and the thermal drift thereof are suppressed within the DC amplifier 5 by the feedback circuit 6.

In FIG. 2, since the operational amplifier 51 of the DC amplifier 5 usually has a large input impedance which is, in this case, with respect to the non-inverting terminal of the operational amplifier 51, it is unnecessary to reduce the output impedance of the feedback circuit 6. Therefore, in order to ensure the above-mentioned larger time constant, the capacity of the capacitor 62 can be reduced and the resistance value of the resistor 63 can be made larger. For example, if the gain of the feedback circuit 6 is 1, the capacity of the capacitor 62 is 1 μF and the resistance value of the resistor 63 is 1.6M Ω to ensure a low pass cut-off frequency 0.1 $H_Z$. The smaller capacity of the capacitor 62 may realize a smaller size feedback circuit (low pass filter), and also may improve the noise characteristic.

As illustrated in FIG. 2, since there is no capacitor means in series between the bridge circuit (acceleration sensor) 1 and the output $V_{OUT}$ of the DC amplifier 5, the phase and amplitude of the sensor output $V_{S1}$ is not changed. Also, in FIG. 2, since the bridge circuit 1 and the operational amplifier 51 are powered by a positive power source $V_+$ and a negative power source $V_-$, a bias current to the operational amplifier 51 is never cut off. Note that the presence of the capacitor 62 does not affect the bias current to the operational amplifier 51 of 6he DC amplifier 5, since the capacitor 62 is connected in parallel with the operational amplifier 51.

Further, reference numeral 10 designates a control circuit for controlling an airbag system in an automobile using the acceleration output $V_{OUT}$. The control circuit 10 is constructed by a microcomputer which includes an A/D converter 101, a central processing unit (CPU) 102, a read-only memory (ROM) 103 for storing programs and fixed data, a random access memory (RAM) 104 for storing temporary data, an input/output (I/O) interface 105, and the like. In FIG. 2, note that the resistors R3 and R4 can be deleted, since the voltage $V_{S2}$ therebetween is meaningless. Also, only one of the resistors R1 and R2 need be a piezoresistance element and the other can be a fixed resistor, although the amplitude of the sensing voltage $V_{S1}$ is made small.

Connected to the I/O interface 105 is an inflator 11 for inflating an airbag 12. The inflator 11 includes a source of gun powder, an ignitor for igniting the gun powder of the gun powder source, and a generator triggered by the ignition of the gun powder for generating pressured hot gas. That is, when the inflator 11 is driven by the control circuit 10, pressured hot gas is injected into the airbag 12, thereby rapidly inflating the airbag 12.

Generally, vibration due to the collision of an automobile has a frequency range from 0.1 $H_Z$, to several k$H_Z$. Also, the thermal drift due to the offset voltage has a much smaller frequency than 0.1 $H_Z$. Therefore, when the cut-off frequency of the feedback circuit (low pass filter) 6 is 0.1 H$_Z$, the above-mentioned thermal drift is completely removed from the output V$_{OUT}$ of the DC amplifier 5. In this state, the operation of the CPU 102 of the control circuit 10 will be explained with reference to FIG. 3.

In FIG. 3, which is an A/D conversion routine executed at predetermined time periods such as 4 ms, at step 301, an A/D conversion is performed upon the output V$_{OUT}$ of the acceleration sensing device. Then, at step 302, it is determined whether or not the output V$_{OUT}$ is negative. If the answer is "NO", then the control proceeds to step 304. On the other hand if V$_{OUT}$ is negative, does the control proceed to step 303 which replaces V$_{OUT}$ by −V$_{OUT}$. That is, an absolute value of V$_{OUT}$ is calculated by steps 302 and 303. Next, at step 304, it is determined whether V$_{OUT}$<V$_{REF}$ (definite value) is satisfied. If the answer is "NO", then the control proceeds to step 306. On the other hand, if V$_{OUT}$<V$_{REF}$, which means that a collision occurs, is satisified, the control proceeds to step 305 which drives the inflator 11, thereby inflating the airbag 12. Otherwise, the control proceeds directly to step 306. The routine of FIG. 3 is completed by step 306.

Thus, the airbag 12 of the automobile can be controlled by using the output V$_{OUT}$ of the acceleration sensing device according to the present invention.

In FIG. 2, as explained above, the bridge circuit 1 and the operational amplifiers 51 and 61 are powered by the positive power source V$_+$ and the negative power source V$_-$. However, when actually used in an automobile, a two-power supply system where a battery voltage such as +12 V∼13 V and ground (OV) are used is adopted.

Figure 4:
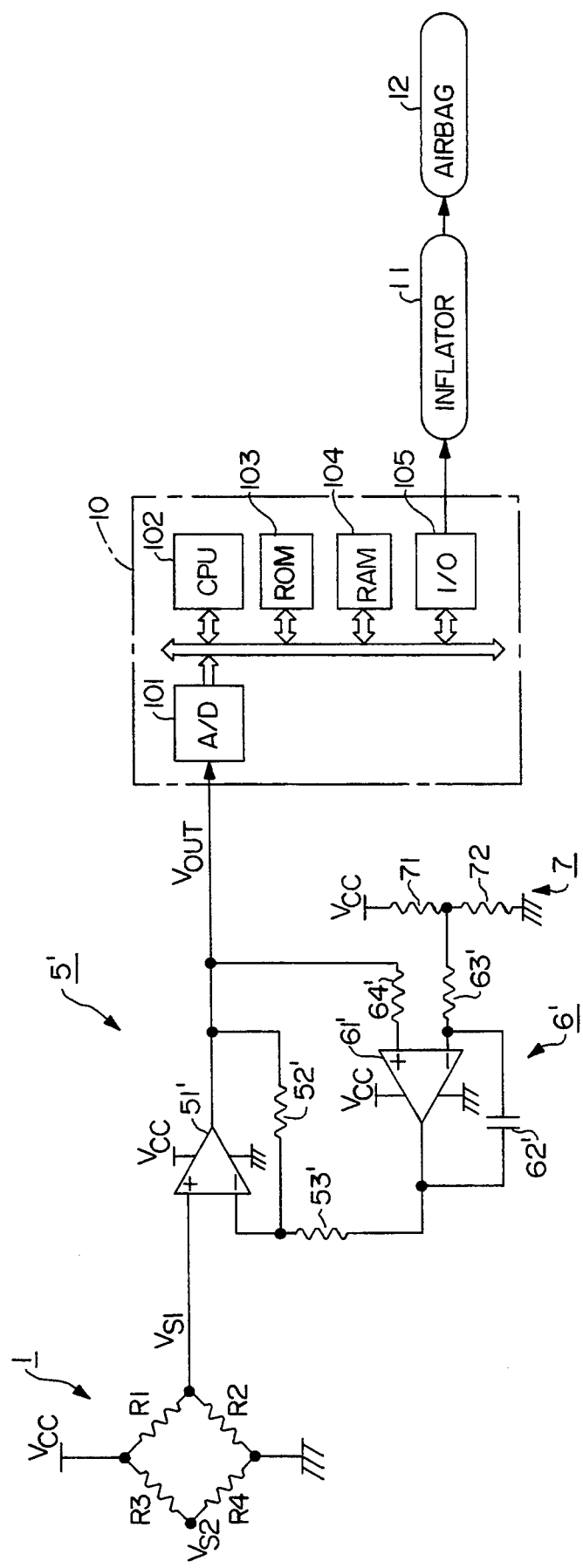
FIG. 4 is a circuit diagram illustrating a second embodiment of the acceleration sensing device according to the present invention.

FIG. 4 illustrates a second embodiment of the present invention adopting the above-mentioned two-power supply system. In FIG. 4, the bridge circuit 1 is powered by a definite positive voltage V$_{CC}$ such as 5 V obtained by reducing the battery voltage and ground. Also, a DC amplifier 5' includes an operational amplifier 51' powered by the voltage V$_{CC}$ and ground, a feedback resistor 52', and an input resistor 53'. Further, a feedback circuit 6' includes an operational amplifier 61' powered by the voltage V$_{CC}$ and ground, a feedback capacitor 62', and input resistor 63' and 64'.

In FIG. 4, the sensing output V$_{S1}$ of the bridge circuit 1 and the output V$_{OUT}$ are changeable around an intermediate level between V$_{CC}$ and ground. Therefore, in order to ensure an initial stable operation of the feedback circuit 6', a voltage divider 7 formed by resistor 71 and 72 is provided to give such an intermediate level to the inverting input terminal of the operational amplifier 61'.

In FIG. 4, the sensing output V$_{S1}$ of the bridge circuit 1 is supplied to the non-inverting input terminal of the operational amplifier 51' of the DC amplifier 5', and the output of the feedback circuit 6' is supplied via the input resistor 53' to the inverting input terminal of the operational amplifier 51' of the DC amplifier 5'. In this case, since the output V$_{OUT}$ of the DC amplifier 5' is supplied via the input resistor 64' to the non-inverting input terminal of the operational amplifier 61' of the feedback circuit 6', the feedback circuit 6' negatively feeds back the output V$_{OUT}$ of the DC amplifier 5' to the input thereof, in the same way as in the device of FIG. 2. Also, the amplification factor of the DC amplifier 5' can be adjusted by the resistance values of the resistors 52' and 53', and the time constant of the feedback circuit (low pass filter) 6' can be adjusted by the capacity of the capacitor 62' and the resistance value of the resistor 63'. Therefore, the acceleration sensing device of FIG. 4 can operate in the same way as that of FIG. 2.

In FIG. 4, note that the resistors R3 and R4 can be deleted, since the voltage V$_{S2}$ therebetween is meaningless. Also, only one of the resistor R1 and R2 need be a piezoresistance element and the other can be a fixed resistor, although the amplitude of the sensing voltage V$_{S1}$ is made small.

Figure 5:
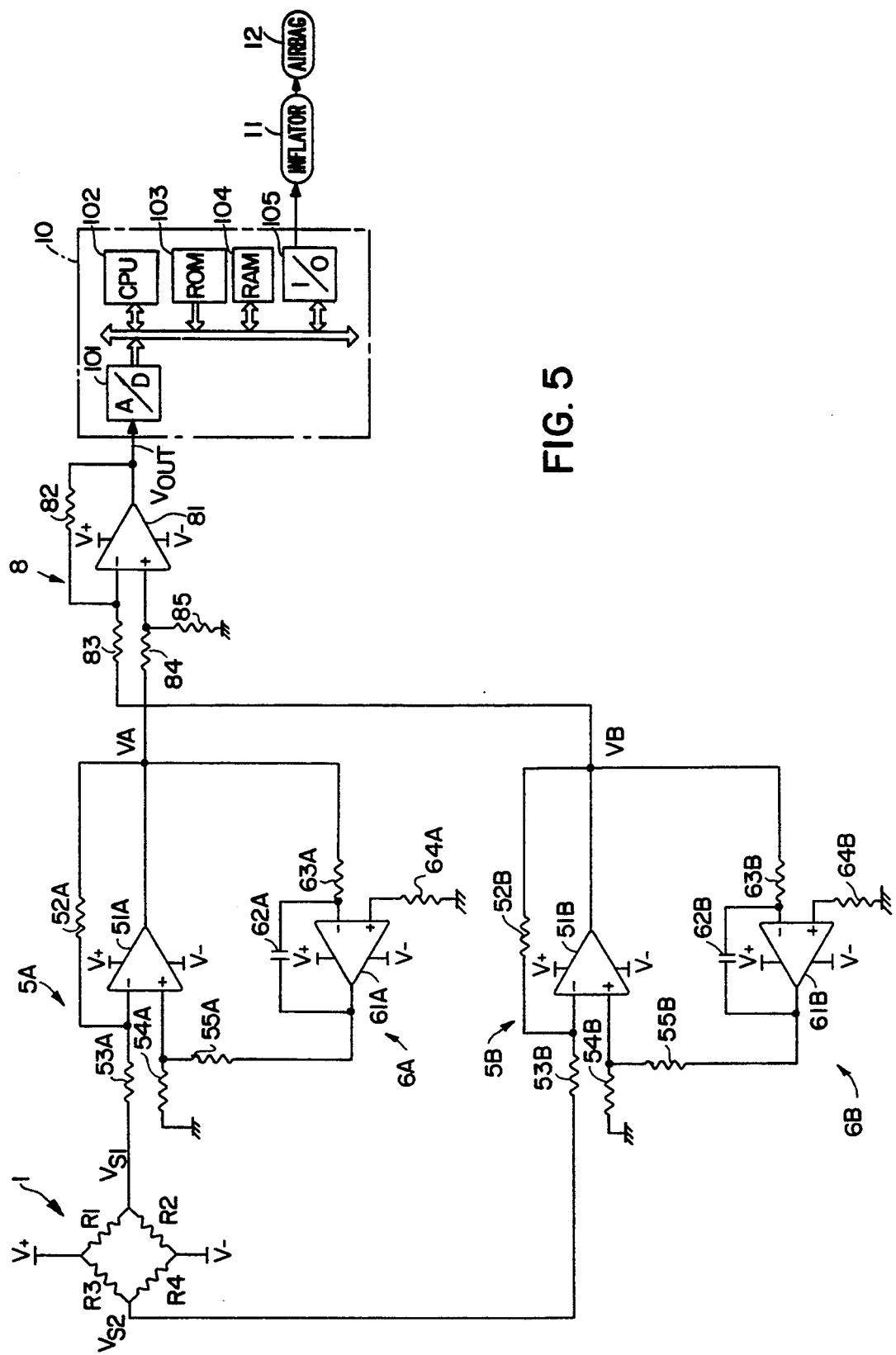
FIG. 5 is a circuit diagram illustrating a third embodiment of the acceleration sensing device according to the present invention.

FIG. 5 illustrates a third embodiment of the acceleration sensing device according to the present invention. In FIG. 5, which is also a modification of the device of FIG. 2, two DC amplifiers 5A and 5B, each of which has the same configuration as the DC amplifier 5 of FIG. 2, are provided. That is, the elements 51A through 55A of the DC amplifier 5A correspond to the elements 51 through 55, respectively, of the DC amplifier 5 of FIG. 2, and the elements 51B through 55B correspond to the elements 51 through 55, respectively, of the DC amplifier 5 of FIG. 5. Also, two feedback circuits 6A and 6B, each of which has the same configuration as the feedback circuit 6 of FIG. 2 are provided. That is, the elements 61A through 64A of the feedback circuit 6A correspond to the elements 61 through 64, respectively, of the feedback circuit 6 of FIG. 5, and the elements 61B through 64B correspond to the elements 61 through 64, respectively, of the feedback circuit 6 of FIG. 2.

Therefore, the offset voltage and the thermal drift thereof in the bridge circuit 1 on the side of the elements R1 and R2 are suppressed within the DC amplifier 5A by the feedback circuit 6A. Thus, the offset voltage and its thermal drift are completely removed from the output VA of the DC amplifier 5A. Similarly, the offset voltage and the thermal drift thereof in the bridge circuit 1 on the side of the elements R3 and R4 are suppressed within the DC amplifier 5B by the feedback circuit 6B. Thus, the offset voltage and its thermal drift are completely removed from the output VB of the DC amplifier 5B.

As explained above, when an acceleration (inertia force) is applied to the weight of the acceleration sensor along the predetermined direction, the potential V$_{S1}$ between the elements R1 and R2 changes in the opposite direction to the change of the potential V$_{S2}$ between elements R3 and R4. As a result, the output VA of the DC amplifier 5A changes in the opposite direction to the change of the output VB of the DC amplifier 5B. Therefore, the difference between the outputs VA and VB of the DC amplifiers 5A and 5B may generate twice the amplitude of the output signal as the output V$_{OUT}$ of the DC amplifier 5 of FIG. 2, which is helpful in further obtaining a more accurate acceleration value.

On the other hand, generally, the thermal drift due to the offset voltage in the bridge circuit 1 on the side of the elements R1 and R2 changes in the same direction as the change of the thermal drift due to the offset voltage in the bridge circuit 1 on the side of the side of the elements R3 and R4. Therefore, the difference between the outputs VA and VB may more completely remove the thermal drift due to the offset voltage in the bridge circuit 1. Particularly, in a transient state such as an initial power-on state, since a large thermal drift due to a rapid increase in temperature cannot be removed from each of the outputs VA and VB of the DC amplifiers 5A and 5B due to the large time constant of each of the low pass filters (i.e., the feedback circuits) 6A and 6B, the difference between the outputs VA and VB is helpful in removing the thermal drift in a transient state.

In order to obtain the above-mentioned difference between the outputs VA and VB of the DC amplifiers 5A and 5B, an adder (precisely, a subtractor) 8 is provided. The adder 8 includes an operational amplifier 81, feedback resistor 82, and input resistors 83 to 85. The resistors 82 to 85 are adjusted so that the adder 8 subtracts the output VB of the DC amplifier 5B from the output VA of the DC amplifier 5A, i.e., the adder 8 calculates a difference $V_{OUT}(=VB-VA)$ between the outputs VA and VB of the DC amplifiers 5A and 5B.

Thus, a vibration having a higher frequency than a predetermined frequency such as 0.1 $H_Z$ can be measured accurately by the acceleration sensing device of FIG. 5, even in a transient state such as an initial power-on state in which the thermal drift may be rapidly increased.

In FIG. 5, at least one of the resistors R1 through R4 need be a piezoresistance element while the others can be fixed resistors, although the amplitude of the output voltage $V_{OUT}$ is made small.

Figure 6:
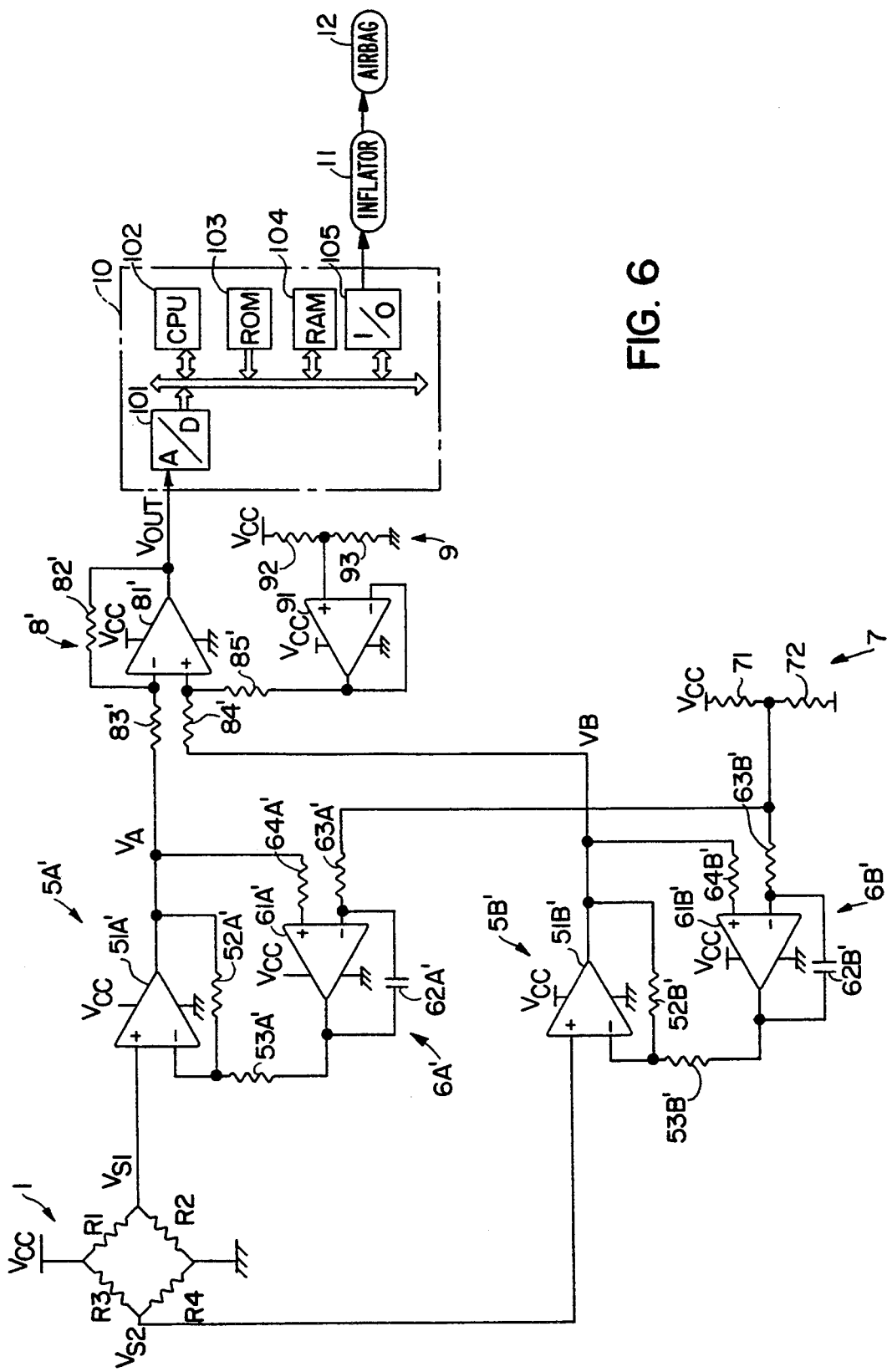
FIG. 6 is a circuit diagram illustrating a fourth embodiment of the acceleration sensing device according to the present invention.

In FIG. 6, which illustrates a fourth embodiment of the present invention, the acceleration sensing device of FIG. 5 is modified by using the acceleration sensing device of FIG. 4. That is, in FIG. 6, two DC amplifiers 5A' and 5B', each of which has the same configuration as the DC amplifier 5' of FIG. 4 are provided. Also, two feedback circuits 6A' and 6B', each of which has the same configuration as the feedback circuit 6' of FIG. 4 are provided. Further, in order to obtain the difference between the outputs VA and VB of the DC amplifiers 5A' and 5B', an adder (precisely, subtractor) 8' corresponding to the adder 8 of FIG. 5 is provided. The adder 8' includes an operational amplifier 81', a feedback resistor 82', and input resistors 83' to 85'. In this case, since the outputs VA and VB of the DC amplifiers 5A' and 5B' have the same polarities as the sensing outputs $V_{S1}$ and $V_{S2}$, respectively the output VA of the DC amplifier 5A ' is supplied to the inverting input terminal of the operational amplifier 81', and the output VB of the DC amplifier 5B' is supplied to the non-inverting input terminal of the operational amplifier 81'. Thus, the adder 8' calculates a difference $V_{OUT}$ (=VA-VB) between the outputs VA and VB of the DC amplifiers 5A' and 5B'. Also, the output $V_{OUT}$ is changeable around an intermediate level between $V_{CC}$ and ground. Therefore, in order to ensure an initial stable operation of the adder 8', a circuit 9 having a voltage follower 91 and a voltage divider formed by resistors 92 and 93 is provided to give such an intermediate level via the input resistor 85' to the non-inverting input terminal of the operational amplifier 81'.

Thus, the acceleration sensing device of FIG. 6 operates in the same way as that of FIG. 5.

Also, in FIG. 6, at least one of the resistors R1 through R4 need be a piezoresistance element while the others can be fixed resistors, although the amplitude of the output voltage $V_{OUT}$ is made small.

In the acceleration sensing devices of FIGS. 2, 4, 5, and 6, although a vibration of an object having a larger frequency than a predetermined frequency such as 0.1 $H_Z$, which is helpful in inflating an airbag, can be measured, it is impossible to measure an acceleration or deceleration having a lower frequency than the predetermined frequency such as 0.1 $H_Z$. For example, in an automobile, when an acceleration state occurs, an incremental fuel is asynchronously injected into the cylinders of an engine, thereby improving the drivability, in addition to a base fuel injection synchronous to every predetermined engine rotational crank angle. Similarly, when deceleration occurs, the synchronous base fuel injection is prohibited, thereby improving the fuel consumption. Such an acceleration or deceleration has a frequency lower than 0.1$H_Z$, for example.

Figure 7:
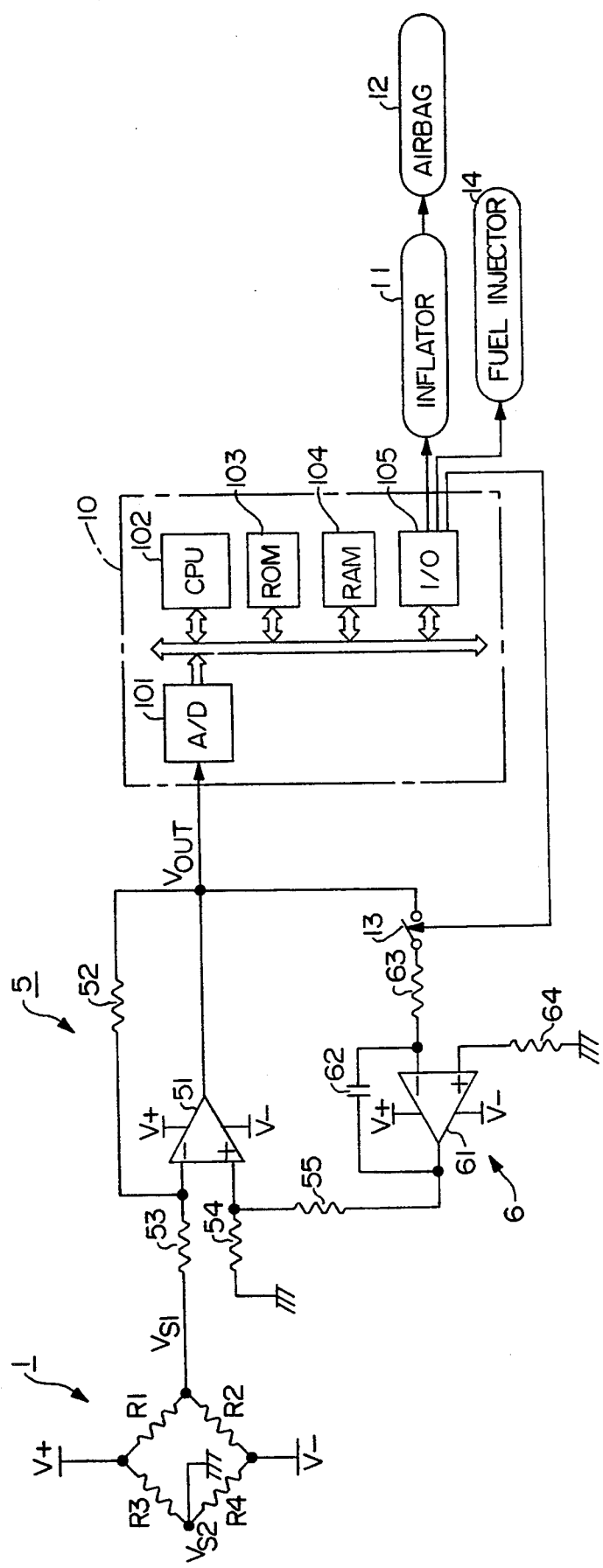
FIG. 7 is a circuit diagram illustrating a fifth embodiment of the acceleration sensing device according to the present invention.

In order to also measure a transition state such as an acceleration state or a deceleration state having a low frequency, the acceleration sensing device of FIG. 2 is modified into an acceleration sensing device as illustrated in FIG. 7 which illustrates a fifth embodiment of the present invention.

In FIG. 7, a switch 13 is provided between the DC amplifier 5 and the feedback circuit 6. The switch 13 can be formed by an enhancement type N-channel metal-oxide-semiconductor (MOS) transistor, for example. When the switch 13 is turned ON by the control circuit 10, the feedback control circuit 6 is enabled, and as a result, the acceleration sensing device of FIG. 7 operates in the same way as the acceleration sensing device of FIG. 2, to thereby measure a vibration of an object having a high frequency, without the thermal drift due to the offset voltage generated in the bridge circuit 1. On the other hand, when the switch 13 is turned OFF by the control circuit 10, the feedback circuit 6 is disabled, and as a result, the DC amplifier 5 may generate an output $V_{OUT}$ showing an acceleration state or a deceleration state having a low frequency. However, in measuring such an acceleration or deceleration state, it is necessary to remove the thermal drift due to the offset voltage generated in the bridge circuit 1 from the output $V_{OUT}$ of the DC amplifier 5. For this purpose, the switch 13 is controlled by the control circuit 10 using the process shown in the flowcharts illustrated in FIGS. 8A and 8B, which will be explained later.

Also, connected to the I/O interface 105 is a fuel injector 14 for injecting fuel into the cylinders of an engine.

Figure 8A:
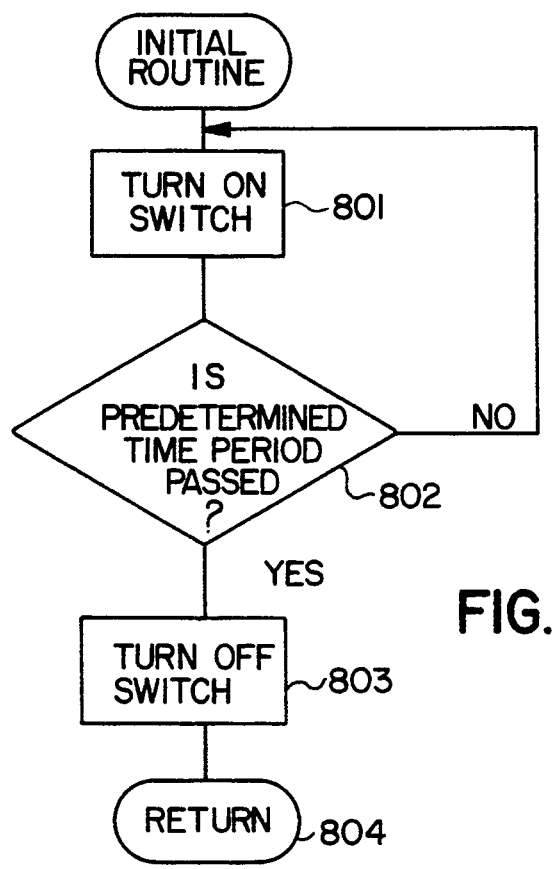
FIGS. 8A and 8B are flowcharts showing the operation of the control circuit of FIG. 7.

In FIG. 8A, which is an initial routine executed after a power-on, at step 801, a high level ("1") signal is generated from the I/O interface 105 to turn ON the switch 13 (which is, in this case, an enhancement type MOS transistor). This ON state of the switch 13 is maintained by steps 802 and 801 for a predetermined time period which is, for example, much larger than the time constant of the feedback circuit 6. As a result, a sufficient negative feedback is applied to the DC amplifier 5 to remove the thermal drift due to the offset voltage generated in the bridge circuit 1 from the output $V_{OUT}$ of the DC amplifier 5. Next, after the above-mentioned predetermined time period has passed, the control proceeds to step 803 which generates a low-level ("0") signal from the I/O interface 105 to turn OFF the switch 13. As a result, no negative feedback is applied to the DC amplifier 5. Then, the routine of FIG. 8A is completed by step 804.

Note that, even after the control enters into step 803, a substantial negative feedback is applied to the DC amplifier 5 for a while, since the charges between the ends of the capacitor 62 is maintained.

Figure 8B:
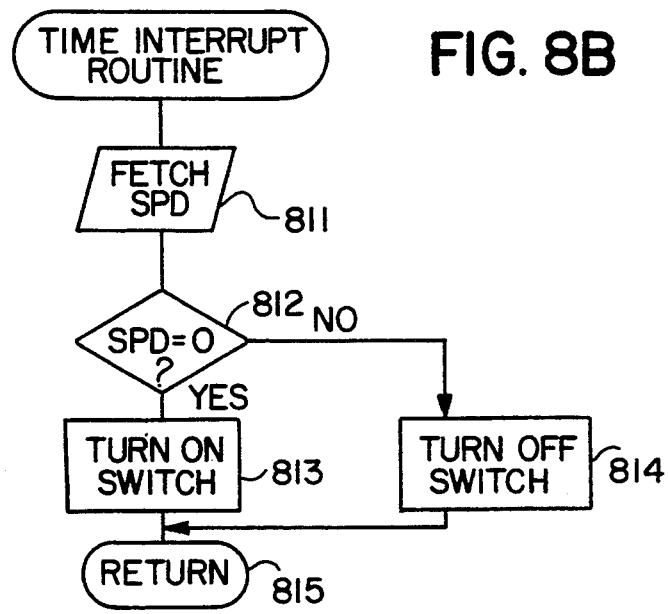

In FIG. 8B, which is a time interrupt routine executed at predetermined time periods such as 4 ms, at step 811, a vehicle speed data SPD is fetched from a vehicle speed sensor (not shown), and at step 812, it is determined whether or not SPD is zero, i.e., the automobile is being stopped. When SPD is zero, the control proceeds to step 813 which turns ON the switch 13, so that a negative feedback is performed upon the DC amplifier 5 to remove the thermal drift due to the offset voltage generated in the bridge circuit 1 from the output $V_{OUT}$ of the DC amplifier 5. Contrary to this, when SPD is not zero, the control proceeds to step 814 which turns OFF the switch 13, so that no negative feedback is applied to the DC amplifier 5. Then, after either steps 813 on 814 the routine of FIG. 8B is completed by step 815.

Note that, even after the control enter into step 814, a substantial negative feedback is applied to the DC amplifier 5 for a while, since the charge between the ends of the capacitor 62 is maintained.

A fuel control for a transition state such as an acceleration state or a deceleration state is well known, but description thereof is omitted, since the present invention has no relation to such a fuel control in an automobile.

Thus, in the acceleration sensing device of FIG. 7, not only the measurement of a vibration of an object for inflating an airbag or the like, but also the measurement of an absolute value of an acceleration or deceleration for controlling a fuel injection or the like can be carried out.

Figure 9:
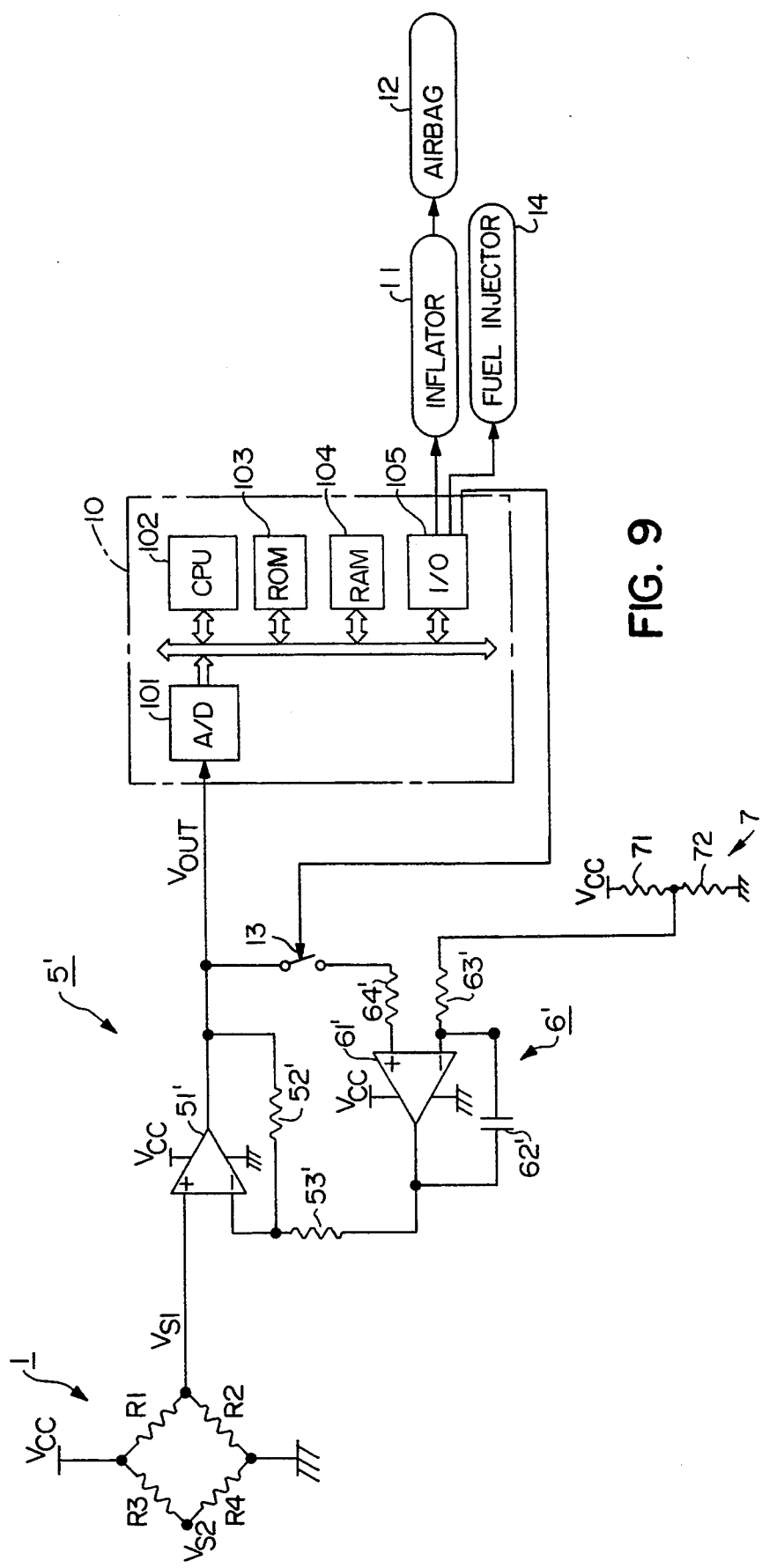
FIG. 9 is a circuit diagram illustrating a sixth embodiment of the acceleration sensing device according to the present invention.

In FIG. 9, which illustrates a sixth embodiment of the present invention, the second embodiment device of FIG. 4 is modified to include a switch 13, to thereby measure an absolute value of an acceleration or deceleration having a relatively low frequency as well as measuring a vibration having a relatively high frequency.

Figure 10:
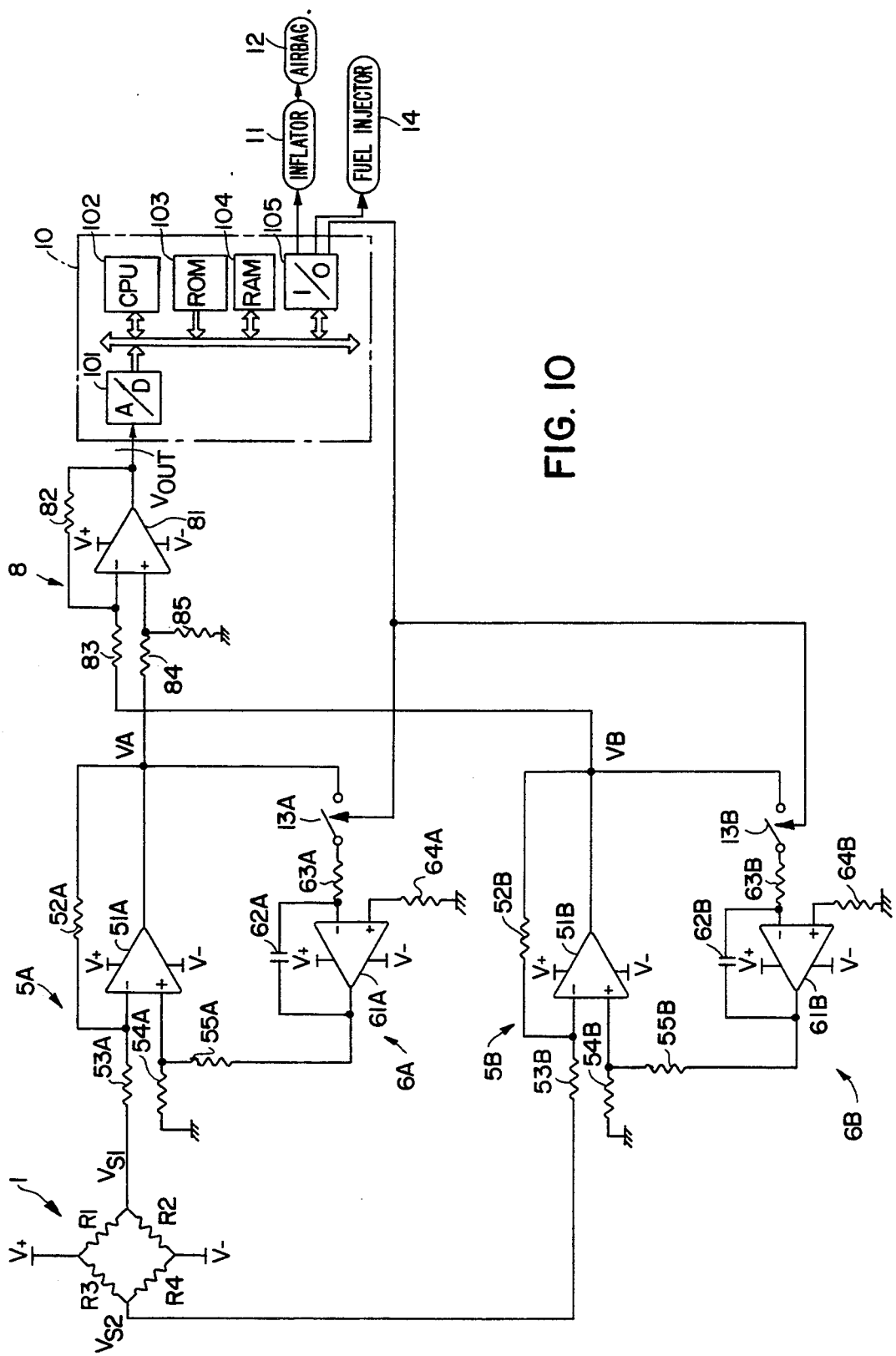
FIG. 10 is a circuit diagram illustrating a seventh embodiment of the acceleration sensing device according to the present invention.
Figure 11:
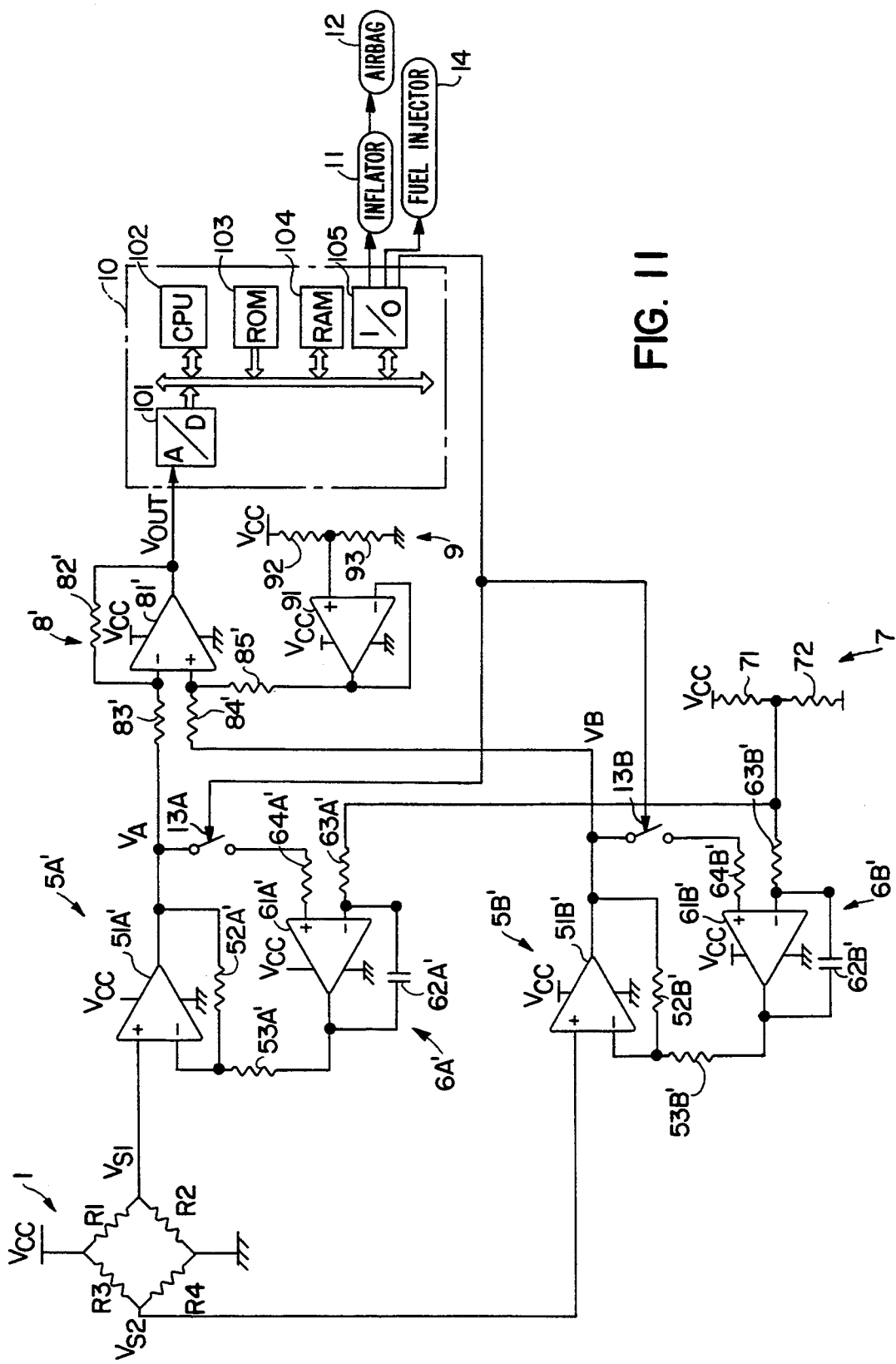
FIG. 11 is a circuit diagram illustrating an eighth embodiment of the acceleration sensing device according to the present invention.

Also, in FIG. 10, which illustrates a seventh embodiment of the present invention, the third embodiment device of FIG. 5 is modified to include switches 13A and 13B, to thereby measure an absolute value of an acceleration or deceleration having a relatively low frequency as well as measuring a vibration having a relatively high frequency. Further, in FIG. 11, which illustrates an eighth embodiment of the present invention, the fourth embodiment device of FIG. 6 is modified to include switches 13A and 13B, to thereby measure an absolute value of an acceleration or deceleration having a relatively low frequency as well as measuring a vibration having a relatively high frequency. Note that the switch 13 (13A,13B) of FIGS. 9, 10, and 11 operates in the same way as that of FIG. 7.

Figure 12:
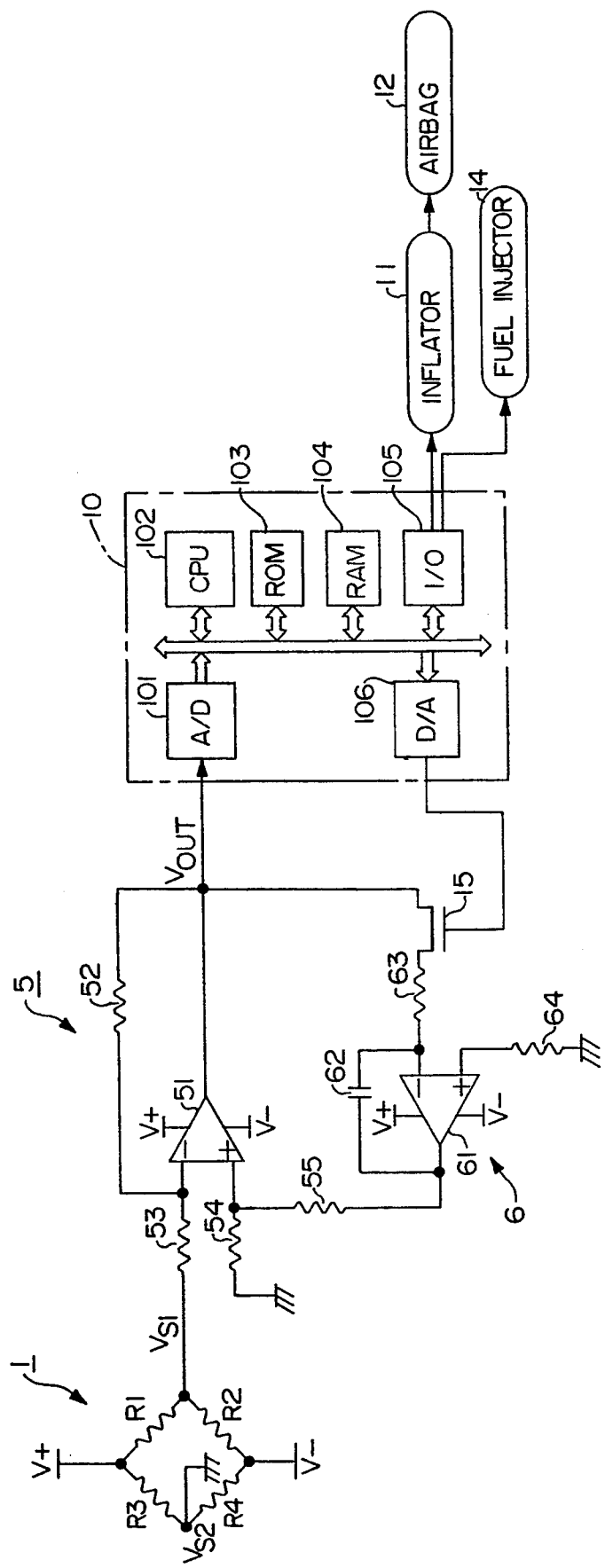
FIG. 12 is a circuit diagram illustrating a ninth embodiment of the acceleration sensing device according to the present invention.

In FIG. 12, which illustrates a ninth embodiment of the present invention, the fifth embodiment device of FIG. 7 is modified. That is, a depletion type N-channel MOS transistor 15 is provided instead of the switch 13 of FIG. 7. The resistance of the depletion type transistor 15 is changed by the control circuit 10 via a digital-/analog (D/A) converter 106 thereof. For example, the resistance of the depletion type transistor 15 can be changed from several $\Omega$ to several tens of M$\Omega$ in accordance with a control voltage applied to the gate thereof, and accordingly, the time constant of the feedback circuit 6 can be changed in accordance with the above-mentioned control voltage. In this case, when a high control voltage ($V_H$) is applied to the gate of the depletion type transistor 15 by the control circuit 10, the time constant of the feedback circuit 6 is so small that the cut-off frequency thereof is a relatively large value such as 0.1 H$_Z$. As a result, the acceleration sensing device of FIG. 12 operates in the same way as the acceleration sensing device of FIG. 2, that is, the feedback circuit 6 is substantially enabled, to thereby measure the vibration of an object having a high frequency, without the thermal drift due to the offset voltage generated in the bridge circuit 1. On the other hand, when a low control voltage ($V_L$) wherein $V_L < V_H$, is applied to the gate of the depletion type transistor 15 by the control circuit 10, the time constant of the feedback circuit 6 is so large that the, cut-off frequency thereof is a relatively smaller value than 0.1 H$_Z$. As a result, the feedback circuit 6 is substantially disabled, and accordingly, the DC amplifier 5 may generate an output $V_{out}$ showing an acceleration state or a deceleration state having a low frequency. However, also in measuring such an acceleration or deceleration state, in order to remove the thermal drift due to the offset voltage generated in the bridge circuit 1 from the output $V_{OUT}$ of the DC amplifier 5, depletion type transistor 15 is controlled by the control circuit 10 using the process shown in the flowcharts illustrated in FIGS. 13A and 13B.

Figure 13A:
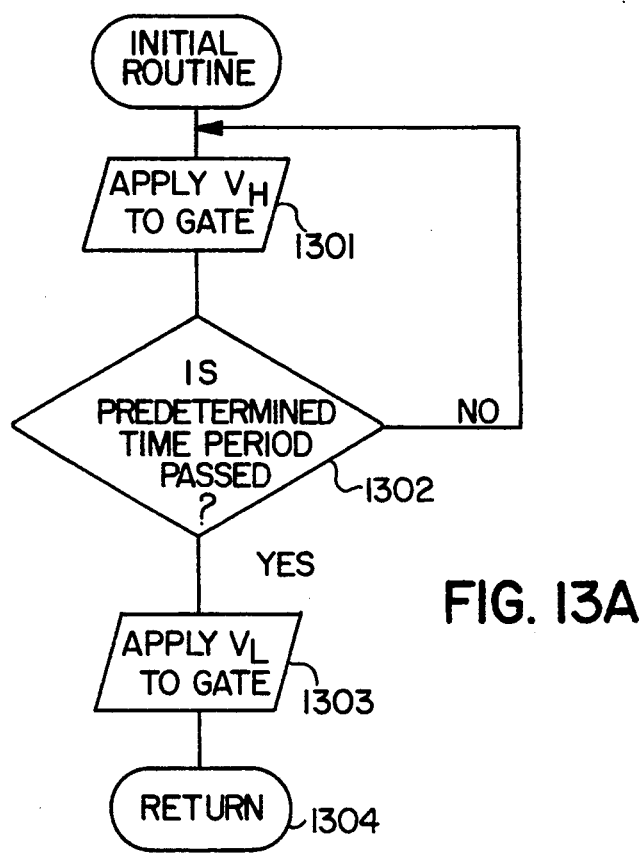
FIGS. 13A and 13B are flowcharts showing the operation of control circuit of FIG. 12.

In FIG. 13A, which is an initial routine executed after a power-on, at step 1301, a high voltage $V_H$, is applied to the gate of the depletion type transistor 15, and accordingly, the time constant of the feedback circuit 6 is substantially reduced. This state of the depletion type transistor 15 is maintained by steps 1302 and 1301 for a predetermined time period which is, for example, much larger than the time constant of the feedback circuit 6. As a result, a negative feedback is sufficiently performed upon the DC amplifier 5 to remove the thermal drift due to the offset voltage generated in the bridge circuit 1 from the output $V_{OUT}$ of the DC amplifier 5. Next, after the above-mentioned predetermined time period has passed, the control proceeds to step 1303 which generates the low voltage $V_L$ via the D/A converter 106. As a result, the low voltage $V_L$ is applied to the gate of the depletion-type transistor 15, and accordingly, the time constant of the feedback circuit 6 is substantially increased. Therefore, a negative feedback upon the DC amplifier 5 is substantially stopped. Then, the routine of FIG. 13A is completed by step 1304.

Note that, even after the control enters into step 1303, a substantial negative feedback is applied to the DC amplifier 5 for a while, since the charge between the ends of the capacitor 62 is maintained.

Figure 13B:
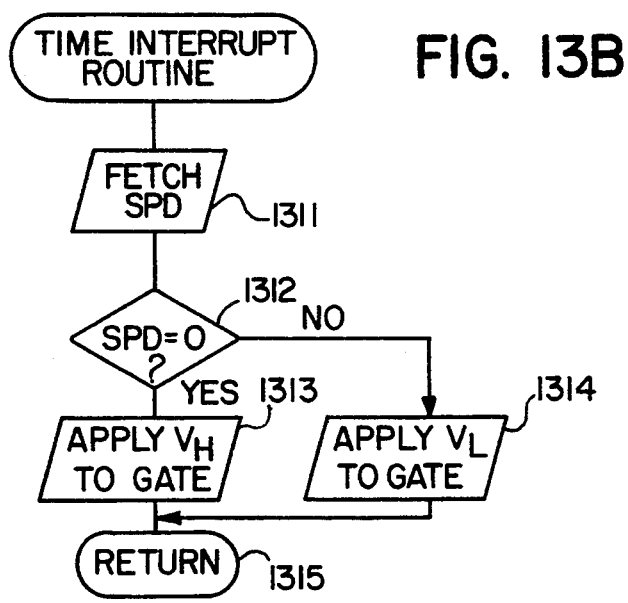

In FIG. 13B, which is a time interrupt routine executed at predetermined time periods such as 4 ms, at step 1311, a vehicle speed data SPD is fetched from the vehicle speed sensor (not shown), and at step 1312, it is determined whether or not SPD is zero, i.e., the automobile is being stopped. When SPD is zero, the control proceeds to step 1313 which applies the high voltage $V_H$ to the gate of the depletion type transistor 15. Therefore, the time constant of the feedback circuit 6 is substantially reduced. On the contrary, when SPD is not zero, the control proceeds to step 1314 which generates the low voltage $V_L$ via the D/A converter 106. As a result, the low voltage $V_L$ is applied to the gate of the depletion type transistor 15, and accordingly, the time constant of the feedback circuit 6 is substantially increased. Therefore, a negative feedback upon the DC amplifier 5 is substantially stopped. Then, after either steps 1313 or 1314 the routine of FIG. 13B is completed by step 1315.

Note that, even after the control enters into step 1314, a substantial negative feedback is applied to the DC amplifier 5 for a while, since the charge between the ends of the capacitor 62 is maintained.

Thus, also in the acceleration sensing device of FIG. 12, not only the measurement of a vibration of an object for inflating an airbag or the like but also the measurement of an obsolute value of an acceleration or deceleration for controlling a fuel injection or the like can be carried out.

Figure 14:
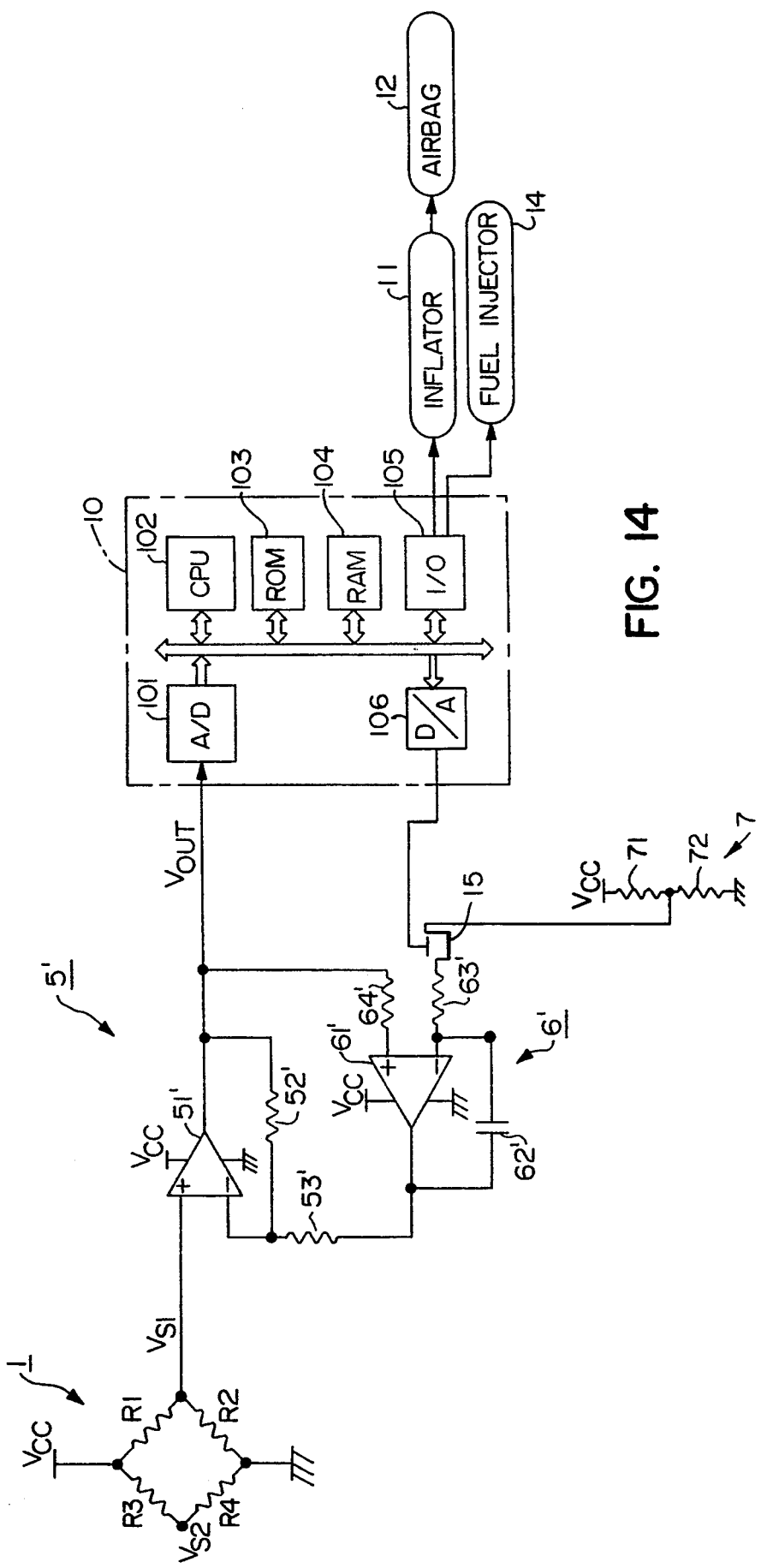
FIG. 14 is a circuit diagram illustrating a tenth embodiment of the acceleration sensing device according to the present invention.
Figure 15:
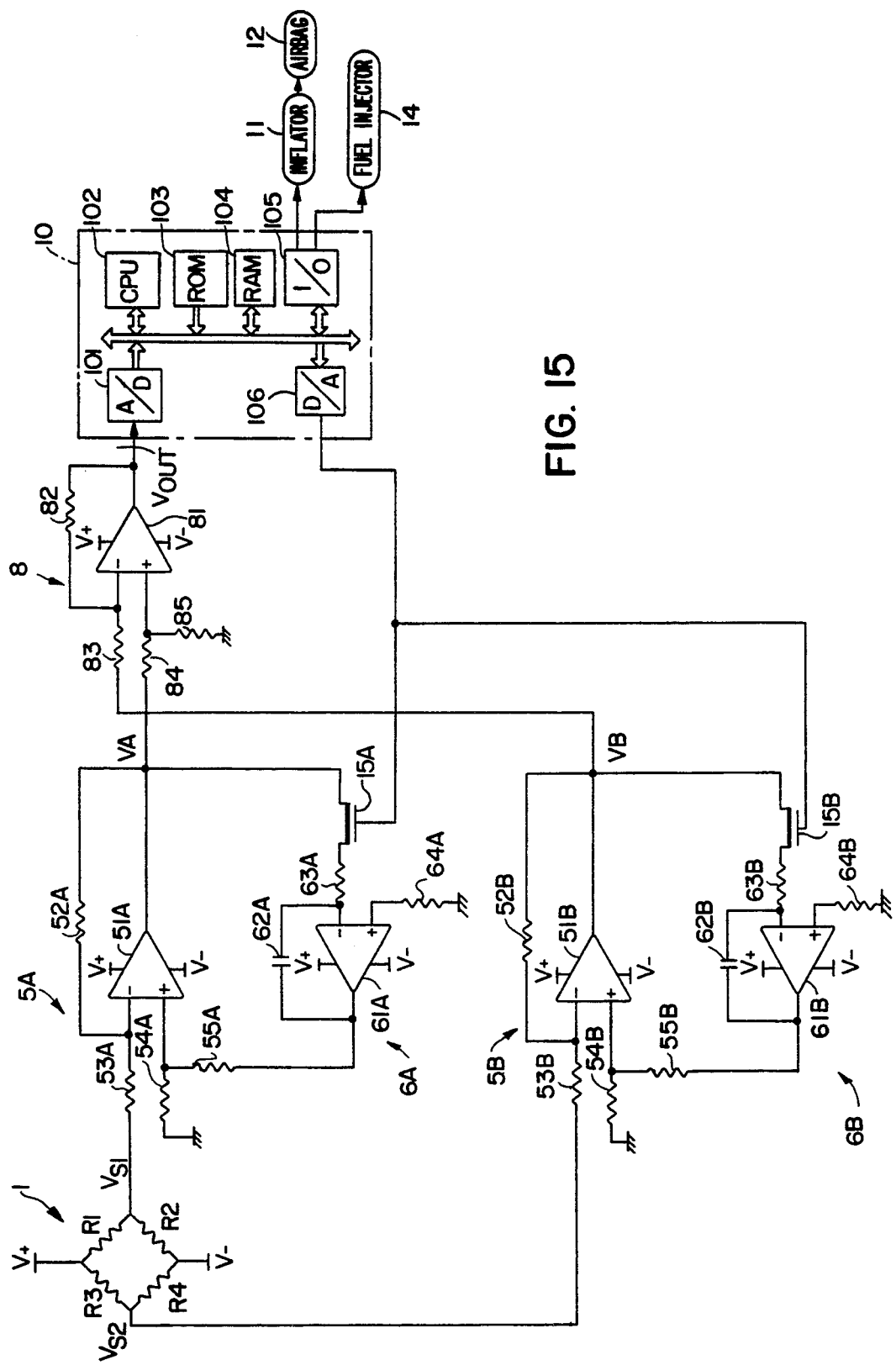
FIG. 15 is a circuit diagram illustrating an eleventh embodiment of the acceleration sensing device according to the present invention.
Figure 16:
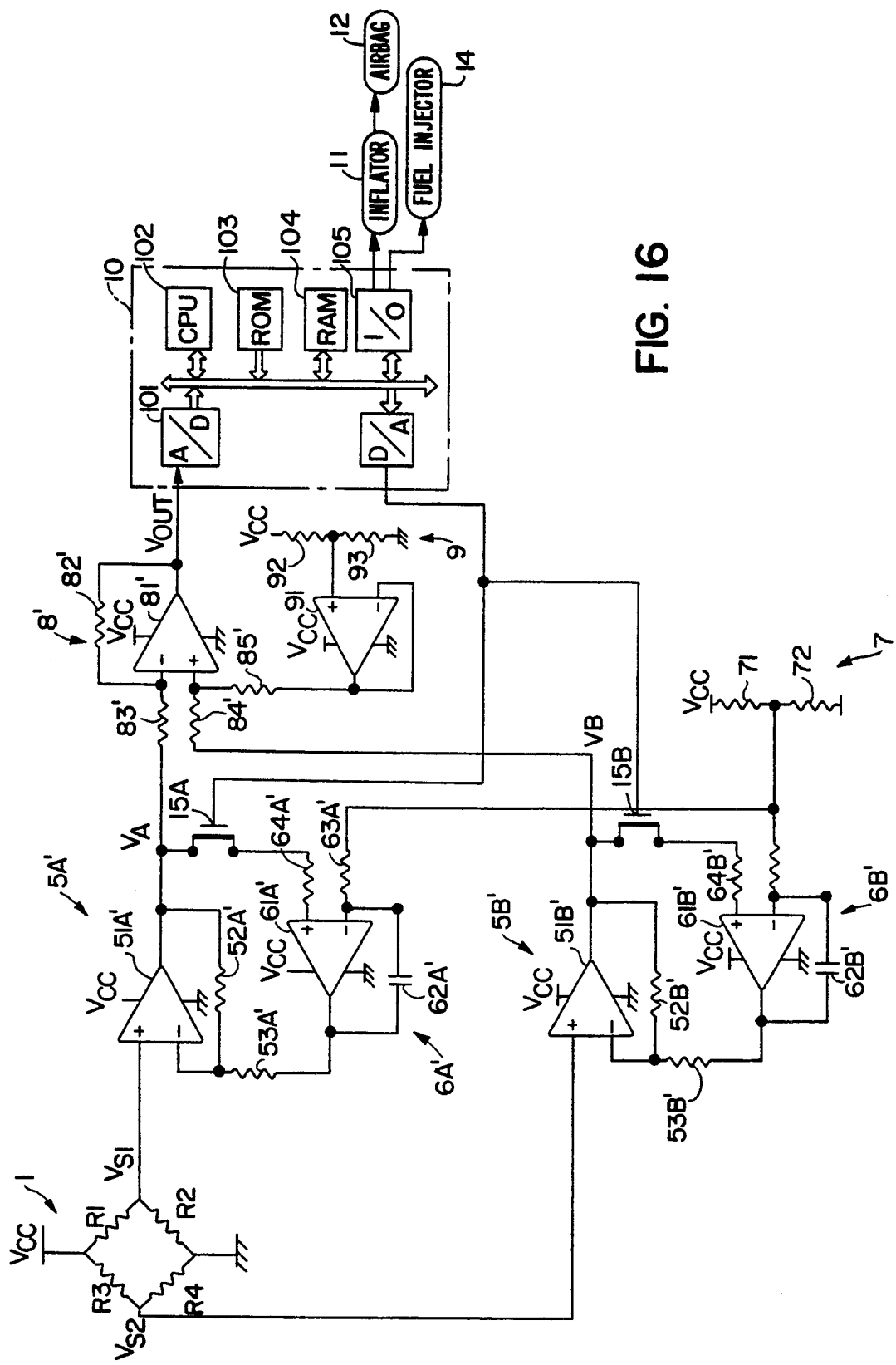
FIG. 16 is a circuit diagram illustrating a twelveth embodiment of the acceleration sensing device according to the present invention.

In FIG. 14, which illustrates a tenth embodiment of the present invention, the second embodiment device of FIG. 4 is modified to include a depletion-type MOS transistor 15, to thereby measure an absolute value of an acceleration or deceleration having a relatively small frequency as well as measuring a vibration having a relatively high frequency. Also, in FIG. 15, which illustrates a eleventh embodiment of the present invention, the third embodiment device of FIG. 5 is modified to include depletion type MOS transistors 15A and 15B, to thereby measure an absolute value of an acceleration or deceleration having a relatively low frequency as well as measuring a vibration having a relatively high frequency. Further, in FIG. 16, which illustrates a twelveth embodiment of the present invention, the fourth embodiment device of FIG. 6 is modified to include depletion type MOS transistors 15A and 15B, thereby measuring an absolute value of an acceleration or deceleration having a relatively low frequency as well as measuring a vibration having a relatively high frequency. Note that the depletion type transistor 15(15A, 15B) of FIGS. 14, 15, and 16 operates in the same way as that of FIG. 12.

As explained above, according to the present invention, since a low frequency component of the acceleration output of the DC amplifier is negatively fed back to the input of the DC amplifier, and the feedback circuit (low pass filter) does not exist in series between the output of the acceleration sensor and the acceleration output, an accurate acceleration value can be obtained. Also, since the DC amplifier usually has a high input impedance, the capacity of the capacitor of the feedback circuit can be reduced to thereby improve the noise characteristic thereof. Further, since the DC amplifier per se can cancel an offset voltage generated in the DC amplifier, the manufacturing cost can be reduced.

Also, according to the present invention, since a switch means or a resistance changeable means is connected to the feedback circuit to disable the feedback circuit, an absolute value of acceleration can be obtained without an offset voltage and a thermal drift thereof.

I claim:

1. An acceleration sensing device comprising:
   an acceleration sensor for generating an output signal corresponding to an acceleration applied to said acceleration sensor;
   a DC amplifier, having a first input connected to said acceleration sensor, for amplifying the output signal of said acceleration sensor to generate an acceleration output, said DC amplifier having a DC amplification characteristic; and
   a negative feedback circuit, connected between the output and a second input of said DC amplifier, said negative feedback circuit including a low-pass filter for negative feeding a low frequency component of an output signal of said DC amplifier back to said second input of said DC amplifier while blocking a high frequency component of said output signal from being fed back to said second input, said first and second inputs comprising, in operation, low frequency components of opposite polarity, thereby causing said DC ampifier to produce said output signal substantially without both offset voltage and thermal drift.

2. A device as set forth in claim 1, wherein said negative feedback circuit comprises:
   an input resistor circuit connected to the output of said DC amplifier;
   an operational amplifier having an inverting input for receiving the output signal of said DC amplifier via said input resistor circuit, a non-inverting input for receiving a definite power supply voltage, and an output connected to the input of said DC amplifier; and
   a feedback capacitor connected between the output and inverting input of said operational amplifier.

3. A device as set forth in claim 1, wherein said negative feedback circuit comprises:
   a first input resistor circuit connected to the output of said DC amplifier;
   a second input resistor circuit for receiving a definite power supply voltage;
   an operational amplifier having a non-inverting input for receiving the output signal of said DC amplifier via said first input resistor circuit, an inverting input for receiving the output signal of said DC amplifier via said second resistor circuit, and an output connected to the input of said DC amplifier; and
   a feedback capacitor connected between the output and inverting input of said operational amplifier.

4. A device as set forth in claim 1, wherein said acceleration sensor comprises two resistors at least one of which has a resistance value corresponding to the acceleration applied to said acceleration sensor.

5. A device as set forth in claim 1, further comprising a switch means, connected to said negative feedback circuit, for enabling said negative feedback circuit when said switch means is turned ON and disabling said negative feedback circuit when said switch is turned OFF.

6. A device as set forth in claim 5, wherein said switch means comprises an enhancement type MOS transistor.

7. A device as set forth in claim 1, further comprising a resistance variable means, connected to said negative feedback circuit, for enabling said negative feedback circuit when said resistance variable means has a small resistance value and disabling said negative feedback circuit when said resistance variable means has a large resistance value.

8. A device as set forth in claim 7, wherein said resistance variable means comprises a depletion type MOS transistor.

9. A device as set forth in claim 1, wherein said DC amplifier comprises:
   a first input resistor circuit connected to said acceleration sensor;
   a second input resistor circuit connected to said negative feedback circuit;
   an operational amplifier having an inverting input for receiving the output signal of said acceleration sensor via said first input resistor circuit, a non-inverting input for receiving the output signal of said negative feedback circuit via said second resistor circuit, and an output serving as said acceleration output; and
   a feedback resistor connected between the output and inverting input of said operational amplifier.

10. A device as set forth in claim 9, wherein said negative feedback circuit comprises:
    a third input resistor circuit connected to the output of said DC amplifier, an second operational amplifier having an inverting input for receiving the output signal of said DC amplifier via said third input resistor circuit, a non-inverting input for receiving a definite power supply voltage, and an output connected to the input of said DC amplifier, and a feedback capacitor connected between the output and inverting input of said second operational amplifier.

11. A device as set forth in claim 1, wherein said DC amplifier comprises:

a first input resistor circuit connected to said acceleration sensor;

an operational amplifier having a non-inverting input for receiving the output signal of said acceleration sensor, an inverting input for receiving the output signal of said negative feedback circuit via said first resistor circuit, and an output serving as said acceleration output; and a feedback resistor connected between the output and inverting input of said operational amplifier.

12. A device as set forth in claim 11, wherein said negative feedback circuit comprises:

a second input resistor circuit connected to the output of said DC amplifier;

a third input resistor circuit for receiving a definite power supply voltage;

a second operational amplifier having a non-inverting input for receiving the output signal of said DC amplifier via said second input resistor circuit, an inverting input for receiving the output signal of said DC amplifier via said third resistor circuit, and an output connected to the inverting input of said DC amplifier via said first resistor circuit thereof; and a feedback capacitor connected between the output and inverting input of said second operational amplifier.

13. A device as set forth in claim 1, wherein said acceleration sensor comprises a semiconductor sensor.

14. A device as set forth in claim 13, wherein said semiconductor sensor is of the piezoresistance effect type.

15. An acceleration sensing device comprising:

an acceleration sensor of a bridge circuit type including at least one resistor whose resistance value is changeable in response to an acceleration applied to said acceleration sensor, said sensor generating a first output signal corresponding to said acceleration from a first point thereof and a second output signal from a second point diagonal to said first point;

a first DC amplifier, having a first input connected to said acceleration sensor, for amplifying the first output signal of said acceleration sensor, said DC amplifier having a DC amplification characteristic;

a first negative feedback circuit, connected between the output and a second of said first DC amplifier, said first negative feedback circuit including a first low-pass filter for negatively feeding a low frequency component and a DC component of an output signal back to said first DC amplifier while blocking a high frequency component of said output signal of said first DC amplifier;

a second DC amplifier, having a first input connected to said acceleration sensor, for amplifying the second output signal of said acceleration sensor, said DC amplifier having a DC amplification characteristic;

a second negative feedback circuit, connected between the output and a second input of said second DC amplifier, said second negative feedback circuit including a second low-pass filter for negatively feeding a low frequency component and a DC component of an output signal back to said second DC amplifier while blocking a high frequency component of said output signal of said second DC amplifier;

said first and second negative feedback circuits, in operation, feeding low frequency components back to said second inputs, said low frequency components having an opposite polarity as those low frequency components present on said first inputs, thereby causing said first and second DC amplifiers to produce output signals substantially without both offset voltage and thermal drift and an adder circuit, connected to said first and second DC amplifiers, for differentially adding the output of said first DC amplifier to that of said second DC amplifier to generate an acceleration output.

16. A device as set forth in claim 15, wherein said of said first and second negative feedback circuits comprises:

an input resistor circuit connected to the output of a respective one of said first and second DC amplifiers;

an operational amplifier having an inverting input for receiving the output signal of a respective one of said first and second DC amplifiers via said input resistor circuit, a non-inverting input for receiving a definite power supply voltage, and an output connected to the input of a respective one of said first and second DC amplifiers; and a feedback capacitor connected between the output and inverting input of a respective one of said first and second operational amplifiers.

17. A device as set forth in claim 15, wherein each of said first and second negative feedback circuit comprises:

a first input resistor circuit connected to the output of a respective one of said first and second DC amplifiers;

a second input resistor circuit for receiving a definite power supply voltage;

an operational amplifier having a non-inverting input for receiving the output signal of a respective one of said first and second DC amplifiers via said first input resistor circuit, an inverting input for receiving the output signal of a respective one of said first and second DC amplifiers via said second resistor circuit, and an output connected to the input of a respective one of said first and second DC amplifiers; and a feedback capacitor connected between the output and inverting input of said operational amplifier.

18. A device as set forth in claim 15, further comprising:

a first switch means, connected to said first negative feedback circuit, for enabling said first negative feedback circuit when said first switch means is turned ON and disabling said first negative feedback circuit when said first switch is turned OFF; and a second switch means, connected to said second negative feedback circuit, for enabling said second negative feedback circuit when said second switch means is turned ON and disabling said second negative feedback circuit when said second switch is turned OFF.

19. A device as set forth in claim 18, wherein said switch means comprises an enhancement type MOS transistor.

20. A device as set forth in claim 15, further comprising:
a first resistance variable means, connected to said first negative feedback circuit, for enabling said first negative feedback circuit when said first resistance variable means has a small resistance value and disabling said first negative feedback circuit when said first resistance variable means has a large resistance value; and
a second resistance variable means, connected to said second negative feedback circuit, for enabling said second negative feedback circuit when said second resistance variable means has a small resistance value and disabling said second negative feedback circuit when said second resistance variable means has a large resistance value.

21. A device as set forth in claim 20, wherein said resistance variable means comprises a depletion type MOS transistor.

22. A device as set forth in claim 15, wherein said of said first and second DC amplifier comprises:
a first input resistor circuit connected to said acceleration sensor;
a second input resistor circuit connected to a respective one of said first and second negative feedback circuits;
an operational amplifier having an inverting input for receiving the output signal of said acceleration sensor via said first input resistor circuit, a non-inverting input for receiving the output signal of a respective one of said first and second negative feedback circuits via said second resistor circuit, and an output; and
a feedback resistor connected between the output and inverting input of a respective one of said first and second operational amplifiers.

23. A device as set forth in claim 22, wherein said of said first and second negative feedback circuits comprises:
a third input resistor circuit connected to the output of a respective one of said first and second DC amplifier;
a second operational amplifier having an inverting input for receiving the output signal of a respective one of said first and second DC amplifiers via said third input resistor circuit, a non-inverting input for receiving a definite power supply voltage, and an output connected to the input of a respective one of said first and second DC amplifiers; and
a feedback capacitor connected between the output and inverting input of said second operational amplifier.

24. A device as set forth in claim 15, wherein said of said first and second DC amplifiers comprises:
a first input resistor circuit connected to said acceleration sensor;
an operational amplifier having a non-inverting input for receiving the output signal of said acceleration sensor, a inverting input for receiving the output signal of a respective one of said first and second negative feedback circuits via said first resistor circuit, and an output;
a feedback resistor connected between the output and inverting input of said operational amplifier.

25. A device as set forth in claim 24, wherein said of said first and second negative feedback circuits comprises:
a second input resistor circuit connected to the output of a respective one of said first and second DC amplifiers;
a third input resistor circuit for receiving a definite power supply voltage;
a second operational amplifier having a non-inverting input for receiving the output signal of a respective one of said first and second DC amplifiers via said second input resistor circuit, an inverting input for receiving the output signal of a respective one of said first and second DC amplifiers via said third resistor circuit, and an output connected to the inverting input of a respective one of said first and second DC amplifiers via said first resistor circuit thereof; and
a feedback capacitor connected between the output and inverting input of said second operational amplifier.

26. A device as set forth in claim 15, wherein said acceleration sensor comprises a semiconductor sensor.

27. A device as set forth in claim 26, wherein said semiconductor sensor is of the piezoresistance effect type.

28. An acceleration sensing device comprising:
an acceleration sensor for generating an output signal corresponding to an acceleration applied to said acceleration sensor;
a DC amplifier, connected to said acceleration sensor, for amplifying the output signal of said acceleration sensor to generate an acceleration output, said DC amplifier having a DC amplification characteristic;
a negative feedback circuit, connected between the output and input of said DC amplifier, for negatively feeding a low frequency component thereof to the input of said DC amplifier; and
a switch means connected to said negative feedback circuit for enabling said negative feedback circuit when said switch means is turned ON and disabling said negative feedback circuit when said switch is turned OFF.

29. An acceleration sensing device comprising:
an acceleration sensor for generating an output signal corresponding to an acceleration applied to said acceleration sensor;
a DC amplifier, connected to said acceleration sensor, for amplifying the output signal of said acceleration sensor to generate an acceleration output, said DC amplifier having a DC amplification characteristic;
a negative feedback circuit, connected between the output and input of said DC amplifier, for negatively feeding a low frequency component thereof to the input of said DC amplifier; and
a resistance variable means, connected to said negative feedback circuit, for enabling said negative feedback circuit when said resistance variable means has a small resistance value and disabling said negative feedback circuit when said resistance variable means has a large resistance value.

* * * * *